US 012100374B2

(12) United States Patent
Williams (10) Patent No.: US 12,100,374 B2
(45) Date of Patent: Sep. 24, 2024

(54) ARTIFICIAL INTELLIGENCE MODELS FOR COMPOSING AUDIO SCORES

(71) Applicant: Microsoft Technology Licensing, LLC, Redmond, WA (US)

(72) Inventor: Todd Matthew Williams, Maple Valley, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 687 days.

(21) Appl. No.: 17/319,934

(22) Filed: May 13, 2021

(65) Prior Publication Data
US 2022/0366881 A1 Nov. 17, 2022

(51) Int. Cl.
*G10H 1/00* (2006.01)
*G06F 18/214* (2023.01)
(Continued)

(52) U.S. Cl.
CPC ......... *G10H 1/0025* (2013.01); *G06F 18/214* (2023.01); *G06F 40/279* (2020.01);
(Continued)

(58) Field of Classification Search
CPC ................ G10H 1/0025; G10H 1/368; G10H 2210/005; G10H 2210/036;
(Continued)

(56) References Cited

U.S. PATENT DOCUMENTS

| 6,594,629 B1 * | 7/2003 | Basu ................ G10L 25/78 704/251 |
| 7,563,168 B2 * | 7/2009 | Jahnke .............. A63F 13/45 463/35 |

(Continued)

FOREIGN PATENT DOCUMENTS

| CN | 102595153 A | 7/2012 |
| CN | 105323701 A | 2/2016 |

(Continued)

OTHER PUBLICATIONS

Sergio, et al., "Scene2Wav: a deep convolutional sequence-to-conditional SampleRNN for emotional scene musicalization", published online Sep. 10, 2020, Journal of Multimedia Tools and Applications, vol. 80, Issue 2, 2021, pp. 1793-1812 (Year: 2020).*

(Continued)

*Primary Examiner* — Christina M Schreiber
(74) *Attorney, Agent, or Firm* — Workman Nydegger (57) ABSTRACT

A method for training one or more AI models for generating audio scores accompanying visual datasets includes obtaining training data comprising a plurality of audiovisual datasets and analyzing each of the plurality of audiovisual datasets to extract multiple visual features, textual features, and audio features. The method also includes correlating the multiple visual features and textual features with the multiple audio features via a machine learning network. Based on the correlations between the visual features, textual features, and audio features, one or more AI models are trained for composing one or more audio scores for accompanying a given dataset.

18 Claims, 7 Drawing Sheets

(51) Int. Cl.
 G06F 40/279 (2020.01)
 G06N 20/00 (2019.01)
 G06V 10/40 (2022.01)
 G06V 20/40 (2022.01)
 G06V 40/16 (2022.01)
 G10H 1/36 (2006.01)
 G10L 25/57 (2013.01)
 G11B 27/036 (2006.01)

(52) U.S. Cl.
 CPC ............ *G06N 20/00* (2019.01); *G06V 10/40* (2022.01); *G06V 20/41* (2022.01); *G06V 20/46* (2022.01); *G10H 1/368* (2013.01); *G10L 25/57* (2013.01); *G11B 27/036* (2013.01); *G06V 20/44* (2022.01); *G06V 40/172* (2022.01); *G06V 40/174* (2022.01); *G10H 2210/005* (2013.01); *G10H 2210/036* (2013.01); *G10H 2210/111* (2013.01)

(58) Field of Classification Search
 CPC .............. G10H 2210/111; G06N 20/00; G06F 40/279; G06F 18/214; G06V 20/46; G06V 10/40; G06V 20/41; G06V 40/174; G06V 40/172; G06V 20/44; G10L 25/57; G11B 27/036
 USPC ......................................................... 84/634
 See application file for complete search history.

(56) References Cited

U.S. PATENT DOCUMENTS

| | | | | |
|---|---|---|---|---|
| 8,798,438 | B1* | 8/2014 | Yagnik | H04N 21/47217 386/248 |
| 9,721,551 | B2* | 8/2017 | Silverstein | G10H 1/00 |
| 10,176,644 | B2* | 1/2019 | Goossens | H04S 7/30 |
| 10,318,637 | B2* | 6/2019 | Thörn | G10L 15/02 |
| 10,594,757 | B1* | 3/2020 | Shevchenko | G06F 17/18 |
| 10,776,626 | B1* | 9/2020 | Lin | G06N 3/048 |
| 11,024,276 | B1* | 6/2021 | Dabby | G10H 1/0025 |
| 11,049,481 | B1* | 6/2021 | Li | G06N 3/047 |
| 11,183,160 | B1* | 11/2021 | Lerman | G10H 1/368 |
| 11,450,353 | B2* | 9/2022 | Krishnamurthy | H04N 5/91 |
| 2015/0113408 | A1* | 4/2015 | Eppolito | G11B 27/031 715/726 |
| 2019/0057688 | A1* | 2/2019 | Black | G06F 3/167 |
| 2020/0394213 | A1* | 12/2020 | Li | G06V 20/41 |
| 2021/0020149 | A1* | 1/2021 | Li | G11B 27/28 |
| 2021/0295148 | A1* | 9/2021 | Gonsalves | G06N 3/045 |
| 2022/0366881 | A1* | 11/2022 | Williams | G06V 20/46 |

FOREIGN PATENT DOCUMENTS

| | | | | |
|---|---|---|---|---|
| CN | 109862393 | A | * | 6/2019 |
| CN | 109862393 | B | | 6/2022 |
| WO | 0186628 | A2 | | 11/2001 |
| WO | WO-2021211602 | A1 | * | 10/2021 | A61B 5/165 |

OTHER PUBLICATIONS

Huang, et al., "Play it again IMuCo! Music Composition to Match your Mood", Sep. 21, 2020, Proceedings of Second International Conference on Transdisciplinary AI, pp. 9-16 (Year: 2020).*

Fg-Writer, et al., "Add Subtitles or Captions to your Microsoft Stream Video", Retrieved from: https://docs.microsoft.com/en-us/stream/portal-add-subtitles-captions, Aug. 24, 2020, 5 Pages.

Zhang, et al., "The Influence of Background Music of Video Games on Immersion", In Journal of Psychology & Psychotherapy, vol. 5, Issue 4, Jan. 1, 2015, 7 Pages.

Dassani, et al., "Automated Composition of Picture-Synched Music Soundtracks for Movies", In Repository of arXiv:1910.08773v1, Oct. 19, 2019, 10 Pages.

Huang, et al., "Play it again IMuCo! Music Composition to Match your Mood", In Proceedings of Second International Conference on Transdisciplinary AI, Sep. 21, 2020, pp. 9-16.

"International Search Report and Written Opinion Issued in PCT Application No. PCT/US22/024179", Mailed Date: Jul. 5, 2022, 12 Pages.

Sergio, et al., "Scene2Wav: a deep convolutional sequence-to-conditional SampleRNN for emotional scene musicalization", In Journal of Multimedia Tools and Applications, vol. 80, Issue 2, Jan. 31, 2021, pp. 1793-1812.

* cited by examiner

Fig. 6

ARTIFICIAL INTELLIGENCE MODELS FOR COMPOSING AUDIO SCORES

BACKGROUND

A film score is an original music written specifically to accompany a film. A film score may comprise a number of orchestral, instrumental, or choral pieces, which are timed to begin and end at specific points during the film in order to enhance the dramatic narrative and the emotional impact of the scene. Film scores are often written by one or more composers under certain guidelines set by the film's director or producer. The film scores are then performed by an ensemble of musicians, including (but not limited to) an orchestra or band, instrumental soloists, choir and/or vocalists.

Film scores may encompass a large variety of styles of music, depending on the nature of the films they accompany. Composers usually enter the creative process towards the end of filming. The composers are often shown at least unpolished pieces of the film and discuss with the director or producer about what sort of music is required for the film in terms of style and tone. The director and composer will also determine which scenes require original music. The composer may be required to take precision timing notes so that he or she knows how long each cue needs to last, when the music is to begin, when the music is to end, and of particular moments during a scene with which the music may need to coincide in a specific way.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein are related to training one or more Artificial Intelligence (AI) models for generating audio scores for accompanying visual datasets. First, training data comprising a plurality of multimedia datasets are accessed. Each of the plurality of multimedia datasets is analyzed by a machine learning network to extract a plurality of visual features, a plurality of textual features, and/or a plurality of audio features. One or more correlations between the plurality of visual features, textual features, and the plurality of audio features are identified, and one or more AI models are generated based on the identified correlations between the plurality of visual features and the plurality of audio features. The one or more AI models are configured to compose one or more audio scores for accompanying a given dataset, such as (but not limited to) a video dataset, an audiovisual dataset, and/or a textual dataset.

In some embodiments, the one or more AI models include (1) a genre AI model configured to identify one or more genres among a plurality of genres to be used in the one or more audio scores for accompanying the visual dataset, (2) an instrument AI model configured to select one or more instruments among a plurality of instruments to be used in the one or more audio scores, (3) a sound effect AI model configured to select one or more sound effects among a plurality of sound effects to be applied in the one or more audio scores, or (4) an anticipation AI model configured to identify a time in the visual dataset when a particular type of event among a plurality of types of event is about to happen and cause the composed one or more audio scores to start to perform about the identified time.

The embodiments described herein are also related to providing one or more AI models for generating audio scores for accompanying given datasets. The one or more AI models can be provided as a cloud service or deployed at a client computing device. The client computing device provides a dataset to the one or more AI models. The dataset is analyzed to extract one or more visual features and/or one or more textual features. The one or more AI models are configured to identify one or more audio features corresponding to the one or more visual features and/or the textual features. Based on the identified one or more audio features, the one or more AI models are configured to compose one or more audio scores for accompanying the visual dataset.

In some embodiments, the computing system is further configured to receive a user input, indicating a particular schema rule or a particular sound effect. The computing system then generates the audio score based on the user input. The audio score applies the particular schema rule or the particular sound effect.

In some embodiments, the dataset is a previously recorded audiovisual dataset. The computing system is configured to integrate the one or more audio scores into the previously recorded audiovisual dataset as a new audiovisual dataset.

In some embodiments, the dataset is a stream of audiovisual datasets generated during a live event. The computing system is configured to generate the one or more audio scores in substantially real-time, and send the one or more audio scores to the client computing system in substantially real-time, causing the one or more audio scores to be played at the client computing system accompanying the live event.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which.

DETAILED DESCRIPTION

The embodiments described herein are related to training one or more AI models for generating audio scores for accompanying visual datasets.

The term "audio score" used herein covers the use of sound across a range of applications and industries. The term "score" used herein refers to a digital collection of sounds that play at a given time, including references to film score, which includes original music written for a film, such as (but not limited to) triumphant music that plays at the hero appears, the sad music that evokes emotion during a tragedy, or the steady rhythm in the background of a montage of traveling shots. The term "audio score" used herein includes a portion or all the music and/or sounds that are used to support or are synchronized with visual imagery and situations in film, TV, games, and/or live events. Audio scores also cover soundtracks, which include recorded music accompanying and synchronized to motion pictures, television programs, and video games. The term "audio score" used herein also includes sound effects.

A set of audio files that include (but are not limited to) original music, generated sound effects, background noise, and other types of audio are the deliverable from a sound designer. These files have specific uses and are to be played a specific number of times to support the visual story of a game, a film, or a TV show. These files are often layered and faded to enhance their effects in providing an audio context or mood that compliments what's visually seen, such as (but not limited to) a sad moment, a tense situation, or an epic event. Audio scores, including sound effects, are an important part of entertainment and interactive experiences because of the extra layer of emotion and context sound provides.

The embodiments described herein are related to training one or more Artificial Intelligence (AI) models for generating audio scores for accompanying visual datasets. First, training data comprising a plurality of multimedia datasets are accessed. Each of the plurality of multimedia datasets is analyzed by a machine learning network to extract a plurality of visual features, a plurality of textual features, and/or a plurality of audio features. One or more correlations between the plurality of visual features, textual features, and the plurality of audio features are identified, and one or more AI models are generated based on the identified correlations between the plurality of visual features and the plurality of audio features. The one or more AI models are configured to compose one or more audio scores for accompanying a given dataset, such as (but not limited to) a video dataset, an audiovisual dataset, and/or a textual dataset.

The training of the one or more AI models may be performed by one or more AI engines and/or by one or more different entities. In some embodiments, existing AI models are leveraged to train additional AI models. In some embodiments, each or some of the AI models may be trained and provided individually. In some embodiments, the separately trained AI models may be integrated into an overarching AI engine, and/or one or more particular applications. For example, an artist could train and publish their own model, as a way of profiting from their sound. Alternatively, or in addition, in some embodiments, a platform or a standard is created for easily training and/or sharing audio generation AI models.

Figure 1:
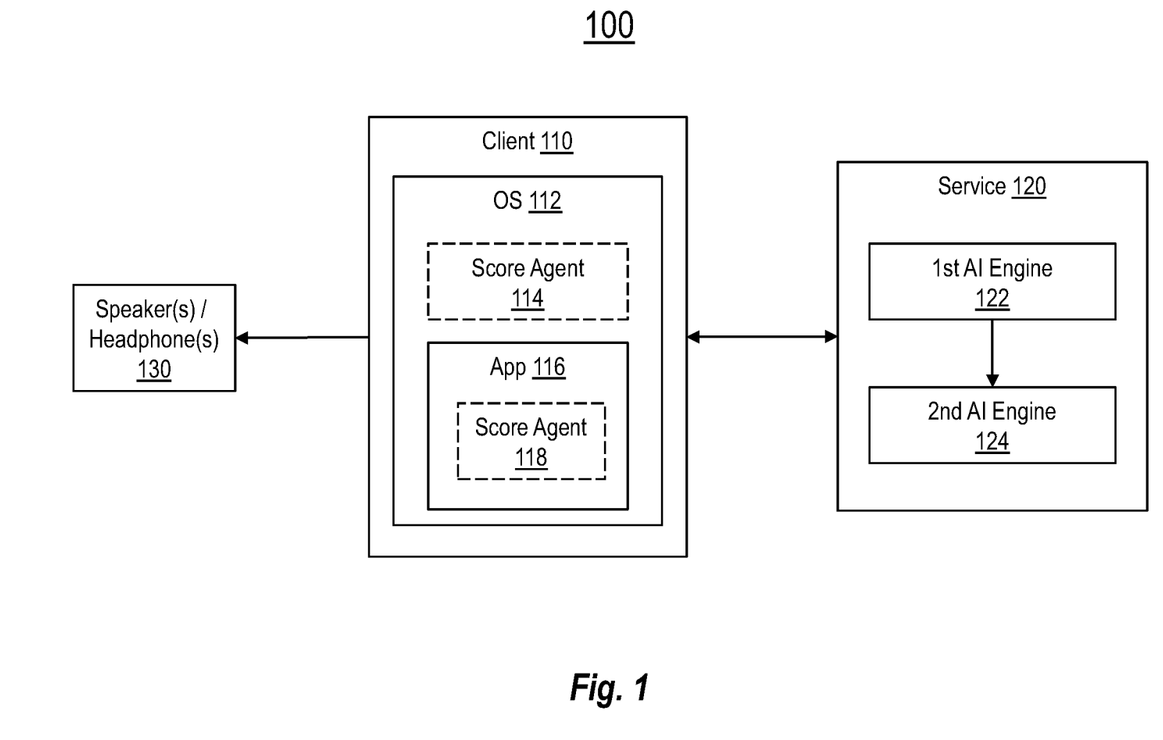
FIG. 1 illustrates an example of an environment in which the principles described herein can be implemented.

FIG. 1 illustrates an example of a system 100 in which the principles described herein may be implemented. As illustrated, a client computing system 110 is configured to communicate with a service computing system 120. The client computing system 110 includes an operating system 112 and/or one or more applications 116. The service computing system 120 includes a first AI engine 122 and a second AI engine 124. The operating system 112 and/or the application 116 include a score agent 114 or 118 configured to communicate with the first AI engine 122 and/or the second AI engine 124 of the service computing system. In particular, the operating system 112 or the application 116 can provide datasets (e.g., visual datasets, audiovisual datasets, and/or textual datasets) to the service computing system 120. The datasets can include recorded videos, runtime generated content, and/or or live streaming of an event. In some embodiments, runtime generated content includes dynamically generated content and/or interactively generated content, such as interactive game.

Receiving the visual datasets or audiovisual datasets, the first AI engine 122 is configured to perform various analysis, including (but not limited to) sentiment analysis, word analysis (such as how often certain words are used in relation to other words), dialog analysis, facial recognition, computer vision, and object detection of content within a field of view, as well as context awareness like physical location. Since the analysis performed by the first AI engine 122 is capable of facilitating human intelligence, the first AI engine 122 is also referred to as a "cognitive AI engine."

Based on what the first AI engine learns about pictures, film, video, or a live event, the second AI engine 124 is configured to produce a set of sound files that are to be played to support what is seen. In some embodiments, the generated sound files can be sent back to the client computing system 110 in substantially real-time, causing a speaker and/or a headphone 130 (coupled to the client computing system 110) to play the generated sound files accompanying the live event and/or the runtime generated content. Since the second AI engine 124 is capable of generating audio scores, the second AI engine 124 is also referred to as an "audio scoring AI engine." In some embodiments, the runtime generated content (e.g., interactive game audio) is also played or streamed directly to the speakers as well. Although audio files (saved audio data or bits) are easy to pass to other systems or store for later use, saving and transferring files would take extra time. In some embodiments, the generation of a sound file is not a requirement, and a stream could also be created to reduce latency in the case of a live event or game.

In some embodiments, sounds are generated for what is happening in a video at a given time. For example, when sentiment analysis of the first AI engine 122 detects a sad conversation, the second AI engine 124 is configured to produce somber music to accompany that section of the videos. As another example, when the sentiment in the video change, the second AI engine 124 would produce other types of music.

Further, in some embodiments, the second AI engine 124 is configured to use artificial intelligence (AI) and machine learning (ML) for detecting patterns and associations. The detected patterns and associations are used to further enhance the service, by mimicking styles of famous composers or replicating the audio feeling of popular movies. For example, in a consumer version, a home video could be analyzed and updated to feel more dramatic with music and effects similar to a STAR WARS® movie.

Additionally, in some embodiments, when a major character enters a scene, a theme song is played. For example, the appearance of DARTH VADER® from STAR WARS® is often accompanied by a theme song. Sometimes, the DARTH VADER® theme song starts before he appeared on screen to create a more dramatic effect. The movie JAWS® is another good example of the anticipation and thrill achieved from the sound being played at the right time during a film. In some embodiments, the anticipation effect is one of many configurations for linking audio to a character. In some embodiments, AI are used to figure out which characters and scenes would benefit the most from this treatment based on evaluations of similar effects in film.

Going beyond video and film, the principles described herein can also be implemented during live events or dynamic storytelling in video games. To support improvised type shows or events today, where there is a host and audience, the most successful solution is a live band or Disk Jockey (DJ). The band or DJ is able to respond and play the music that fits the situation that would be difficult to plan out ahead of time.

In existing technologies, for iterative experiences, like games, all or part of the audio is prerecorded and scripted to respond to planned events and overall story. Unlike the existing game systems, for multiplayer games or virtualized social events that do not have the luxury of a live band or DJ, an AI-powered audio scoring system (e.g., system 100 of FIG. 1) described herein could analyze the experience in real-time, producing an audio score that is infinitely extendable and dynamic to handle any improvised situations, such as a conversation or joke that was not scripted ahead of time. Also, two users in a live virtual experience, standing in the same location, could have different audio scores based on the content they are currently looking at, i.e., the content within their own field of view. For example, one user could be looking at something majestic in one direction, and the other user could be looking in the opposite direction toward a creepy forest, while both users are standing in the same spot but have completely different experiences based on what they see and hear.

In some embodiments, video frames of a head-mounted device or a live game experience are analyzed by cognitive AI services to determine the appropriate tone of audio to play or construct. In some embodiments, cameras are used to capture video and audio of a live event for analysis. In some embodiments, systems are capable of being tuned for cultural sensibilities and musical tastes. In some embodiments, in an enterprise environment, custom audio provides a layer of delight to standard business applications, adding a wider variety of sound possibilities to presentations, data, and document content, tracking toward corporate and team goals, or remote conference conversation enhancements. For example, different chimes can be played depending on the content, sentiment, or sender of an email.

In some embodiments, the system can also be extended to provide audio enhancement of a live situation for hearing-impaired users by generating additional audio effects. Another benefit of an AI-generated audio score would be the ease of finding effective audio to accompany enterprise and consumer-generated content without the worry of copyright infringement or disenfranchising artists.

As illustrated in FIG. 1, the service computing system 120 includes a first AI engine 122 and a second AI engine 124. In some embodiments, the first AI engine 122 and the second AI engine 124 can be the same AI engine that is integrated together. In some embodiments, the first AI engine 122 and the second AI engine 124 are two separate AI engines, each of which can be trained separately and/or provided by separate services. For example, in some cases, the first AI engine 122 is trained for more generic purposes, and the second AI engine 124 is configured to leverage the functions of the first AI engine 122.

Figure 2A:
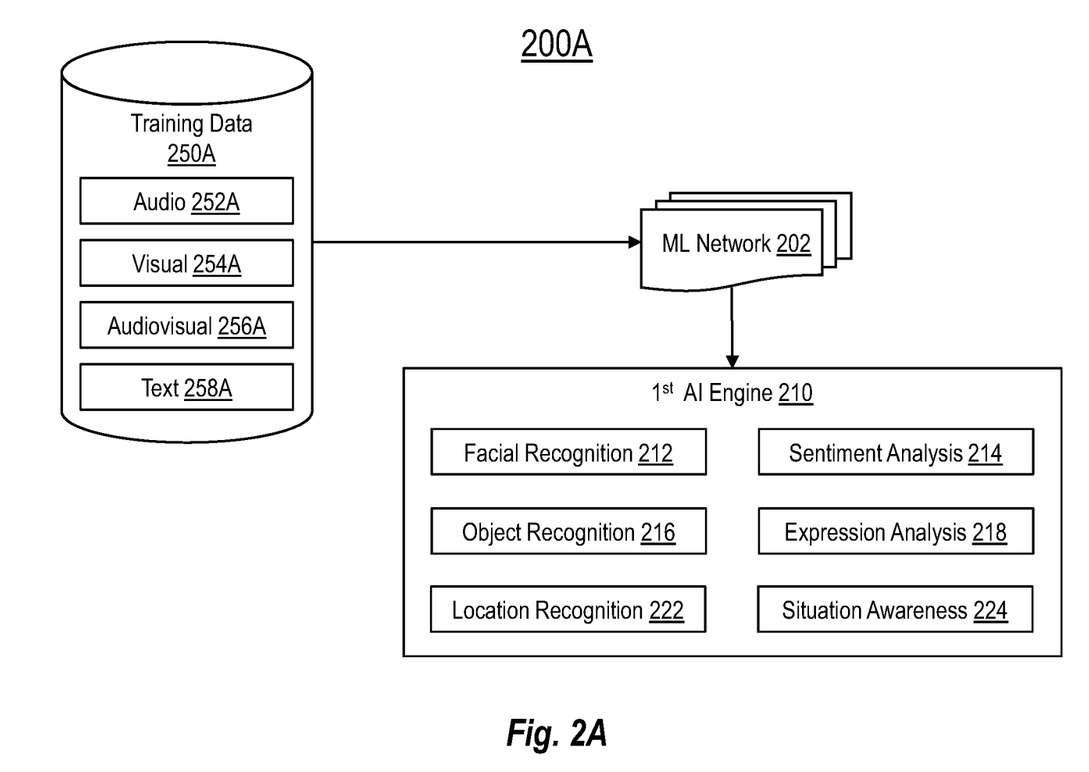
FIG. 2A illustrates an example of an embodiment for training a first Artificial Intelligence (AI) engine.

FIG. 2A illustrates an example of an embodiment 200A for training a first AI engine 210 (which corresponds to the first AI engine 122 of FIG. 1) via a machine learning network 202. In some embodiments, the machine learning network 202 includes one or more ML neural networks 202. As illustrated, training data 250A are fed into the ML network 202 to train a first set of one or more AI models that form the first AI engine 210. In some embodiments, the training data 250A includes (but is not limited to) audio datasets 252A, visual datasets 254A, audiovisual datasets 256A, and/or text datasets 258A. In some embodiments, the first set of one or more AI models include (but are not limited to) a facial recognition model 212, a sentiment analysis model 214, an object recognition model 216, an expression analysis model 218, a location recognition model 222, and/or a situation awareness model 224.

The facial recognition model 212 is configured to recognize a particular human face and/or recognize that a human face is present in response based on an image and/or video dataset. The sentiment analysis model 214 is configured to determine one or more sentiments (e.g., happy, sad, afraid, bored, etc.) based on textual content and/or conversation in an audio and/or video dataset. Textual content includes (but not limited to) documents generated by word processors and/or other text editors, extensible markup language (XML) files, JavaScript object notation (JSON) files, or other data formats that are textual in nature. The object recognition model 216 is configured to recognize objects in an image and/or video dataset. The expression analysis model 218 is configured to detect one or more human expressions based on an image or video dataset. The location recognition model 222 is configured to identify geolocation based on an image and/or video dataset, hardware embedded geo data, and/or device owner input. The situation awareness model 224 is configured to identify a current situation (e.g., live concert, a talk show, a family event) based on an image and/or video dataset, hardware embedded time stamps, and/or device owner input. Although, in some cases, the hardware embedded geo data or time stamps may not be desirable. For example, a movie could be shot in Los Angeles, Calif. on a set that looks like a French café. In such a case, the visual data will be used to extract or estimate the location.

Figure 2B:
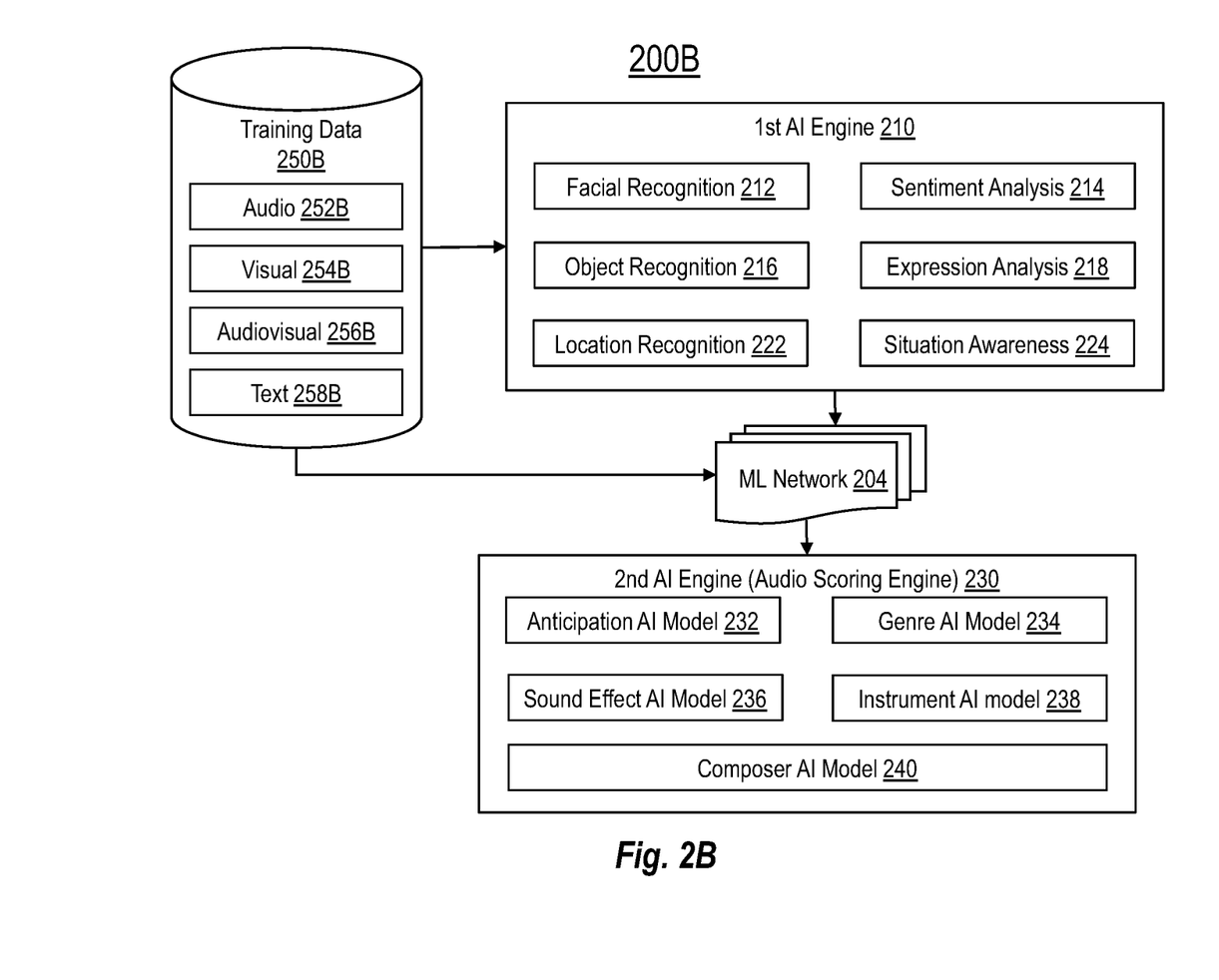
FIG. 2B illustrates an example of an embodiment for training an audio scoring AI engine.

FIG. 2B illustrates an example of an embodiment 200B for training a second AI engine 230 (which corresponds to the second AI engine 124 of FIG. 1) via a second ML network 204. As illustrated, training data 250B are sent to the first AI engine 210 (which is trained via the process of FIG. 2A) and a second machine learning network 204 (that is different from the machine learning network 202 of FIG. 2A). In some embodiments, the machine learning network 204 also includes one or more ML neural networks. As illustrated, the training data 250B includes (but is not limited to) audio datasets 252B, visual datasets 254B, audiovisual datasets 256B, and textual datasets 258B. The training data 250B may or may not be the same as the training data 250A.

Receiving the training data 250B, the first AI engine 210 is configured to (1) identify faces via the facial recognition AI model 212, (2) identify one or more sentiments via the sentiment analysis AI model 214, (3) identify objects via the object recognition AI model 216, (4) identify one or more expressions via the expression analysis AI model 218, (5) identify a location via the location recognition AI model 222, and/or (6) identify a situation via the situation awareness AI model 224. The output of the first AI engine 210 and the training data 250B are then fed into the second ML network 204 to train a second set of one or more AI models that form a second AI engine 230 (also referred to as an "audio scoring AI engine"). In some embodiments, the second set of one or more AI models include an anticipation AI model 232, a genre AI model 234, a sound effect AI model 236, an instrument AI model 238, and/or a composer AI model 240.

In some embodiments, the anticipation AI model 232 is configured to identify a point of time at which a particular event is about to happen. The genre AI model 234 is configured to determine a genre of music that is to be applied to an audio score that is to be generated. The sound effect AI model 236 is configured to determine one or more sound effects that are to be applied to the audio score that is to be generated. The instrument AI model 238 is configured to determine one or more instruments that are to be used in the audio score that is to be generated. The composer AI model 240 is configured to compose an audio score. In some embodiments, the composer AI model 240 is configured to compose the audio score based on the determination of the genre AI model and the instrument AI model 238. Alternatively, or in addition, the composer AI model 240 is configured to compose the audio score, mimicking a particular famous composer, a famous song, and/or a famous movie. Once the AI models 212-224 and 232-240 are trained, these AI models can be provided as cloud services or be deployed onto user's devices.

Figure 3:
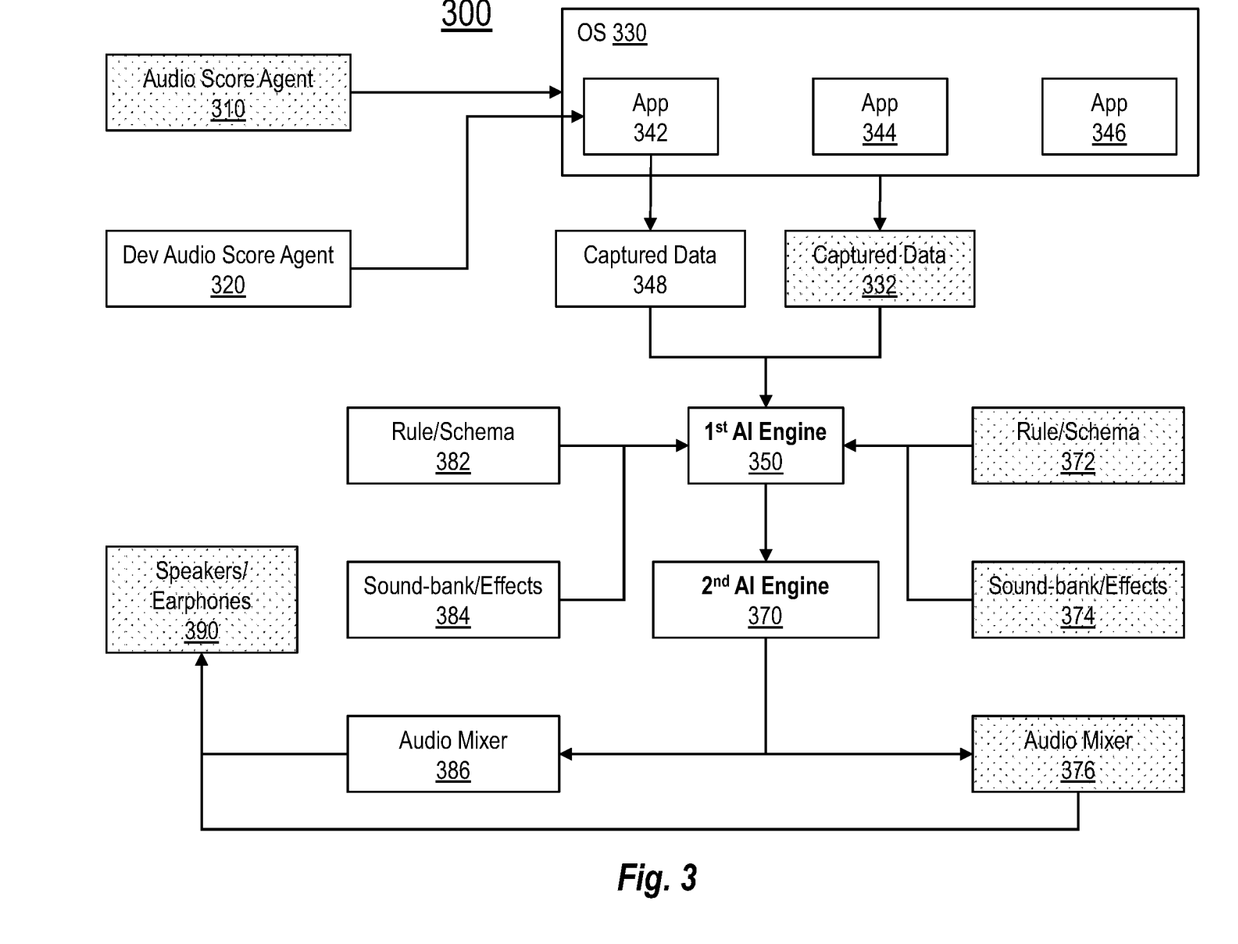
FIG. 3 illustrates an example of a client computing system that includes an audio score agent that can be enabled at operating system (OS) level by a user, or a developer-implemented audio score agent that can be enabled at the application level by the user.

FIG. 3 illustrates an example of embodiment 300, in which the AI models are provided to a client computing device via a first AI engine 350 (also referred to as a cognitive AI engine) and a second AI engine 370 (also referred to as an audio scoring AI engine). The first AI engine corresponds to the first AI engine 122 of FIG. 1 and/or the first AI engine 210 of FIG. 2A. The second AI engine 370 corresponds to the second AI engine 124 of FIG. 1 and the second AI engine 230 of FIG. 2B.

An audio score agent 310 and/or 320 is implemented at a client computing system having an operating system (OS) 330 and multiple applications 342, 344, and 346. In some embodiments, an audio score agent 310 is implemented at the OS level, and can be enabled by a user. Once the audio score agent 310 is enabled at the OS level, data 332, 348 captured by any one of the applications 342-346 can be analyzed by the first AI engine 350 and/or the second AI engine 370.

Alternatively, or in addition, a developer-implemented audio score agent 320 can be enabled at the application level by a user. As illustrated, the developer-implemented audio score agent 320 can be enabled at application 342 by the user. Once the developer implemented audio score agent 320 is enabled, data captured by the application 342 can be sent to and analyzed by the first AI engine 350 and/or the second AI engine 370.

For example, in some embodiments, the application 342, 344, or 346 is a video editing application. The application is configured to send a recorded video to the first AI engine 350 and/or the second AI engine 370, causing the second AI engine 370 to generate an audio score to accompany the recorded video. In some embodiments, the generated audio score is integrated into the recorded video to generate a new video.

As another example, in some embodiments, the application 342, 344, or 346 is a video recording application configured to capture a real-time event via a camera, microphones, or other sensors, coupled to the client computing system. For example, in some embodiments, the camera is configured to capture visual data, and the microphone(s) are configured to detect monolog, applause, or laughter; and/or other sensors are configured to detect lighting, temperature, barcodes, or other sources of ambient data that can be used to drive the system. The application is configured to provide the stream of the captured video to the first AI engine 350 and/or the second AI engine 370 in substantially real time, causing the second AI engine 370 to generate an audio score to accompany the real-time event.

As another example, in some embodiments, the application 342, 344, or 346 is a conference call application configured to record a conference call, including audio datasets and/or audiovisual datasets from multiple participants. The recorded audio datasets and audiovisual datasets can be sent to the first AI engine 350 and/or the second AI engine 370, causing the audio scoring AI engine to generate an appropriate audio score accompanying the conference call based on the topics of the conference and expression of the participants identified by the first AI engine 350. For instance, a motivational event may be hosted over the video conference, where having a more immersive experience is desired, although this feature may be turned off or modified for daily standups or general meetings.

In yet some other embodiments, the application 342, 344, or 346 is a video game application. A stream of video in the video game is sent to the first AI engine 350 and/or the second AI engine 370, causing the second AI engine 370 to generate an audio score accompanying the video game. Alternatively, or in addition, other data, such as a screen of a user, and/or information about known objects and situations that are programmed in the game engine, can be streamed as well. For example, some game engines could create a special data stream before rendering for the system to optimize processing and reduce latency. In some embodiments, when information about known objects and situations that are programmed in the game engine is streamed, some of the object detection and facial recognition are skipped to reduce processing time. In some cases, the characters, locations, and facial animations are known to the computing device as the user interacts or controls their characters. However, some items may not be known, and such items can be obtained via a video stream. In some cases, multiple players are in a same game, and different players may have different fields of view and have different expressions. The second AI engine 370 can generate different audio scores for different players based on their fields of view and/or expressions. For example, the second AI engine 370 can generate triumph music for the winning player, and generate sad music for the losing player.

In some embodiments, the application 342, 344, or 346 is a virtual reality application, and the client computing device is a head-mounted device. The field of view of a user is sent to the first AI engine 350 and/or the second AI engine 370, causing the second AI engine 370 to generate an audio score based on the field of view of the user. As another example, two users may both be in a live virtual experience, standing in the same location, but looking in different directions. One user may be looking at something majestic in one direction, and the other user could be looking in the opposite direction toward a creepy forest, although both users are standing at the same location. In such a case, different audio scores can be generated for the two different users.

Further, in some embodiments, users are allowed to tune the second AI engine 370 to generate audio scores that fit the users' needs or desires. In some embodiments, the OS-implemented audio score agent 310 and/or developer-implemented audio score agent 320 further include one or more rule/schema filters 382, 372 and/or one or more sound-bank/effects filters 384, 374, via which a user is allowed to input their desired settings or desired experiences.

In some embodiments, the one or more rule/schema filters 382, 372 include a plurality of genres that a user can select. In some embodiments, the sound-bank/effects filters 384, 374 include a plurality of well-known performers, a plurality of well-known composers, a plurality of bands, and/or a plurality of well-known movies that the user is allowed to select. The second AI engine 370 is configured to generate an audio score based on the user's selection.

For example, when it is a live event, and the user would like the audio scoring AI engine to produce audio scores to mimic a particular DJ, the user can select the particular DJ effect filter in the sound-bank/effects filters 384, 374. As another example, when there is a business presentation, the user can select classical music in the rule/schema filters 382, 372 to cause the audio scoring AI engine to produce classical background music.

In some embodiments, in a video editing application, the second AI engine 370 can generate a first set of audio scores with or without input of a user. Based on the first set of audio scores, the user can then adjust the filters 382, 372, 384, 374 to cause the second AI engine 370 to generate a second set of audio scores. This process can repeat as many times as needed until the user is satisfied with the audio scores generated by the second AI engine 370.

In some embodiments, a user can tag a particular character in a video as a major character, causing the second AI engine 370 to generate an audio score when that particular character enters a scene or when the second AI engine 370 predicts that the character is likely to enter the scene soon to create a more dramatic effect, like DARTH VADER® in STAR WARS®. The user can also select a particular well-known movie, such as STAR WARS, to cause the second AI engine 370 to create audio scores in a similar genre or style as those in the particular well-known movie.

In some embodiments, the audio score agent 310 or 320 also includes an audio mixer 376, 386. The audio mixer 376, 386 is configured to generate the final audio data based on the music score generated by the audio score AI engine 370. The generated audio data can then be sent to one or more speakers and/or earphones 390 coupled to the client computing device. In some embodiments, the audio mixer 376, 386 can include an audio equalizer, which can be automatically or manually adjusted based on the generate audio data.

Although the previous discussions are primarily related to generating audio scores accompanying audiovisual datasets, it is not necessary that videos are required. The principles described herein can also be implemented in an audio-only situation, such as a radio show or an audiobook. In such an audio-only situation, the first AI engine 350 and the second AI engine 370 are configured to analyze the audio data to generate an additional audio score. For example, the first AI engine 350 is configured to convert the received audio data into textual data and identify sentiments based on the textual data. In some embodiments, the first AI engine 350 can also be configured to identify expressions and/or situations based on the tone of voice in the audio data. The second AI engine 370 can generate an audio score based on the sentiments, expressions, and/or situations identified by the first AI engine 210, for accompanying the original audio data.

Additionally, in yet another embodiment, textual data, image data, and/or a combination thereof are provided to the first AI engine 350 and the second AI engine 370. In some cases, the textual data can be in the form of a sequence of slides or simply a document. The image data can be a set of photos. In some embodiments, the first AI engine 350 is configured to convert textual data and/or image data into a presentation video. The first AI engine 350 is also configured to analyze the received textual data to identify the topics and/or sentiment of the presentation. Based on the topics and/or sentiment of the presentation, the second AI engine 370 is configured to generate an audio score (such as background music) accompanying the presentation video.

Further, the principles described herein can also be used to provide visual enhancement and/or audio enhancement of a live situation for hearing-impaired users. For example, a live event may include loud background music and/or noise. In some embodiments, the second AI engine 370 is configured to filter out the background music and/or noise and enhance a human speaker's voice.

As such, the second AI engine 370 enables computing systems to automatically generate audio scores accompanying audiovisual datasets, audio datasets, image datasets, and/or textual datasets, causing the computing system to function better. Further, the second AI engine 370 can also help users to find and generate effective audio to accompany enterprise and consumer-generated content without the worry of copyright infringement or disenfranchising artists.

Note, even though the embodiment illustrated herein include two AI engines, and one AI engine is built on top of the other AI engine, this embodiment is not necessary. In some embodiments, the audio scoring engine is trained independently without the cognitive AI engine. In some embodiments, each or some of the AI models in the audio scoring engine are trained independently and/or by different entities.

The following discussion now refers to a number of methods and method acts that may be performed. Although the method acts may be discussed in a certain order or illustrated in a flow chart as occurring in a particular order, no particular ordering is required unless specifically stated or required because an act is dependent on another act being completed prior to the act being performed.

Figure 4:
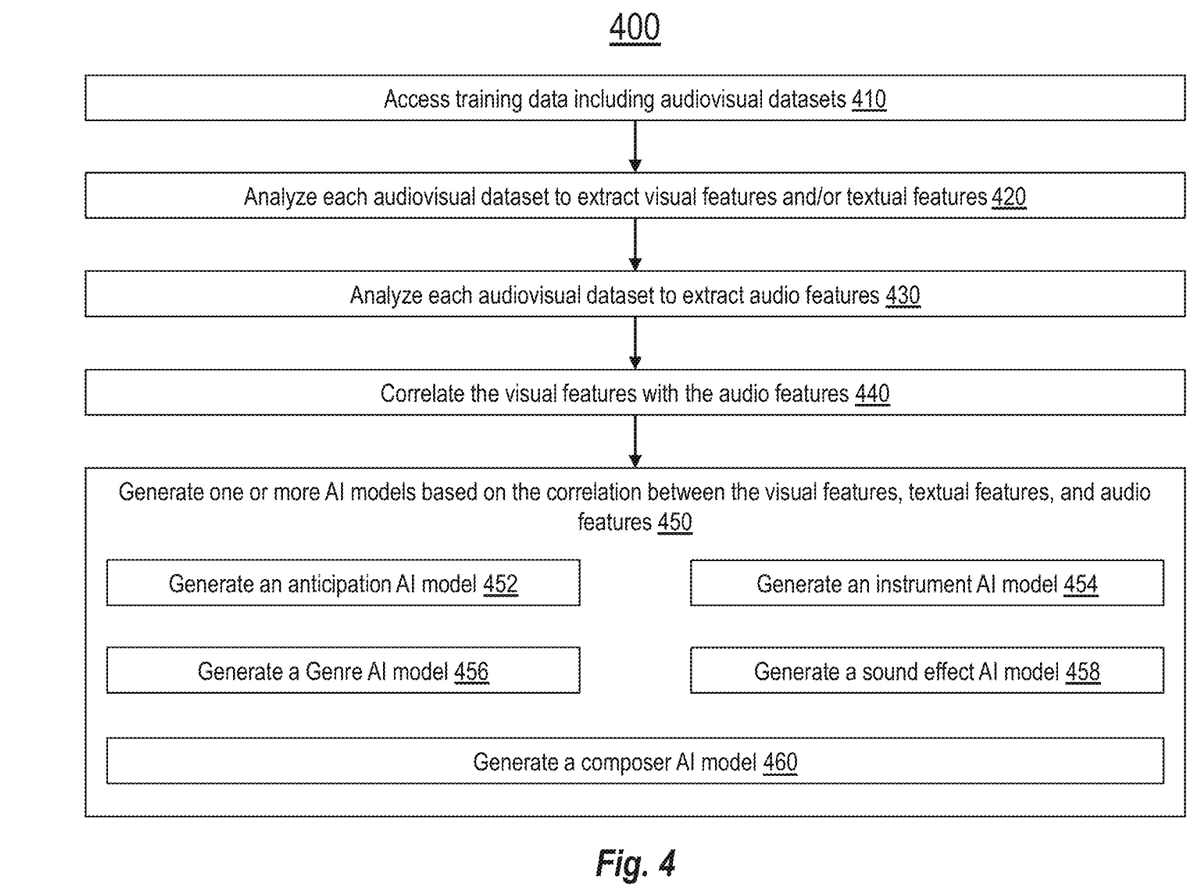
FIG. 4 illustrates a flowchart of an example of a method for training one or more AI models using training data, including audiovisual datasets.

FIG. 4 illustrates a flowchart of an example method 400 for training an audio scoring AI engine (corresponding to the second AI engine 124 of FIG. 1, 230 of FIG. 2B, and/or 370 of FIG. 3). The method 400 includes accessing training data (act 410). The training data can include a plurality of audiovisual datasets and/or a plurality of audio datasets (act 410). The method 400 also includes analyzing each of the plurality of audiovisual datasets to extract a plurality of visual features and/or textual features (act 420). In some embodiments, the plurality of visual features and/or textual features are extracted via one or more machine-learned models, such as the facial recognition AI model 212, the sentiment analysis AI model 214, the object recognition AI model 216, the expression analysis AI model 218, the location recognition AI model 222, and/or the situation awareness AI model 224 in the first AI engine 210.

The method 400 also includes analyzing each audiovisual dataset to extract a plurality of audio features (act 430) and correlating the plurality of visual features with the plurality of audio features (act 440). The method 400 also includes generating one or more AI models based on the correlation between the plurality of visual features, textual features, and the plurality of audio features (act 450). In some embodiments, the generation of the one or more AI models includes (but are not limited to) generating an anticipation AI model corresponding to the anticipation AI model 232 of FIG. 2B (act 452), generating an instrument AI model corresponding to the instrument AI model 238 of FIG. 2B (act 454), generating a genre AI model corresponding to the genre AI model 234 of FIG. 2B (act 456), generating a sound effect AI model corresponding to the sound effect AI model 236 of FIG. 2B (act 458), and/or generating a composer AI model corresponding to the composer AI model 240 of FIG. 2B (act 460). In some embodiments, one or more of the instrument AI model 238, genre AI model 234, sound effect AI model 236, and/or composer AI model is generated separately, and included later as one of the models for creating audio scores. In some cases, different entities may produce different models separately. Some of the AI models (e.g., the composer AI model 240) may be provided or sold to users individually or through a subscription for integration into an overarching AI engine, and/or for integration into one or more particular applications. For example, an artist could publish their own model, as a way of profiting from their sound. Alternatively, or in addition, in some embodiments, a platform or a standard is created for easily sharing audio generation AI models.

The anticipation AI model is configured to identify a point of time at which a particular event is about to happen. The genre AI model is configured to determine a genre of music that is to be applied to an audio score that is to be generated. The sound effect AI model is configured to determine one or more sound effects that are to be applied to the audio score that is to be generated. The instrument AI model is configured to determine one or more instruments that are to be used in the audio score that is to be generated. The composer AI model is configured to compose an audio score. In some embodiments, the composer AI model is configured to compose the audio score based on the determination of the genre AI model and the instrument AI model 238. Alternatively, or in addition, the composer AI model is configured to compose the audio score, mimicking a particular famous composer, a famous song, and/or a famous movie. Once the AI models are trained, these AI models can be provided as cloud services or deployed onto users' devices.

Figure 5:
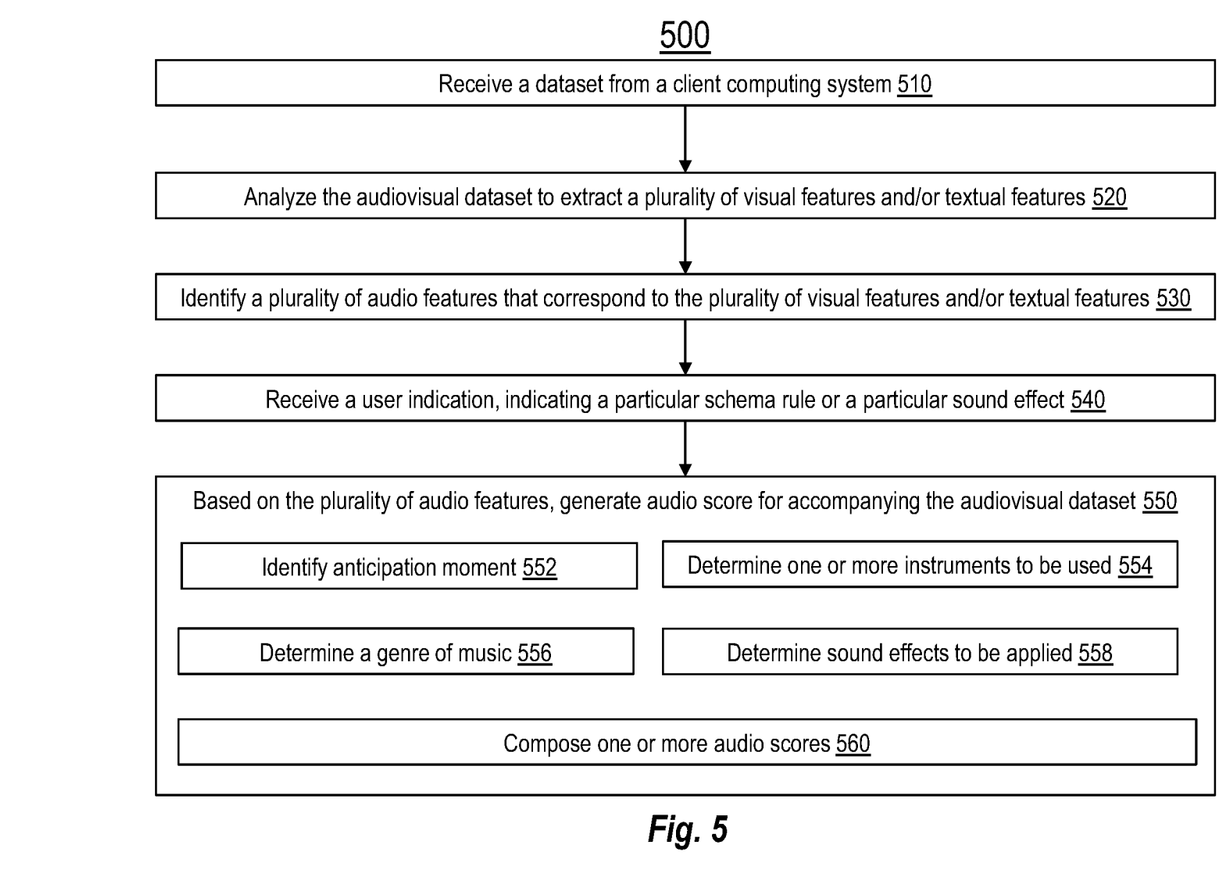
FIG. 5 illustrates a flowchart of an example of a method for providing one or more AI models for generating audio scores for accompanying visual datasets.

FIG. 5 illustrates a flowchart of an example of a method 500 for using one or more machine-trained AI models to generate an audio score for accompanying an audiovisual dataset. The method 500 includes receiving a dataset from a client computing system (act 510). The dataset can be an audiovisual dataset, an audio dataset, and/or a textual dataset. The method 500 further includes analyzing the dataset to extract a plurality of visual features or textual features (act 520). The method 500 further includes identifying a plurality of audio features that correspond to the plurality of visual features and/or the textual features (act 530). In some embodiments, the method 500 also includes receiving a user indication, indicating a particular schema rule or a particular sound effect that is desired by the user (act 540).

Based on the plurality of audio features and user indication, an audio score is generated for accompanying the audiovisual dataset (act 550). In some embodiments, the generation of the audio score includes identifying an anticipation moment in the audiovisual dataset (act 552), determining one or more instruments to be used in the audio score (act 554), determining a genre of music that is to be implemented in the audio score (act 556), and/or determining one or more sound effects that are to be applied to the audio score (act 558). In some embodiments, the generation of the audio score also includes composing one or more audio scores (act 560) based on the identified anticipation moment, one or more instruments to be used, the determined genre of music, and/or the determined sound effects that are to be applied.

Finally, because the principles described herein may be performed in the context of a computing system (for example, each of the client computing system 110 or service computing system 120 is a computing system) some introductory discussion of a computing system will be described with respect to FIG. 6.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 6:
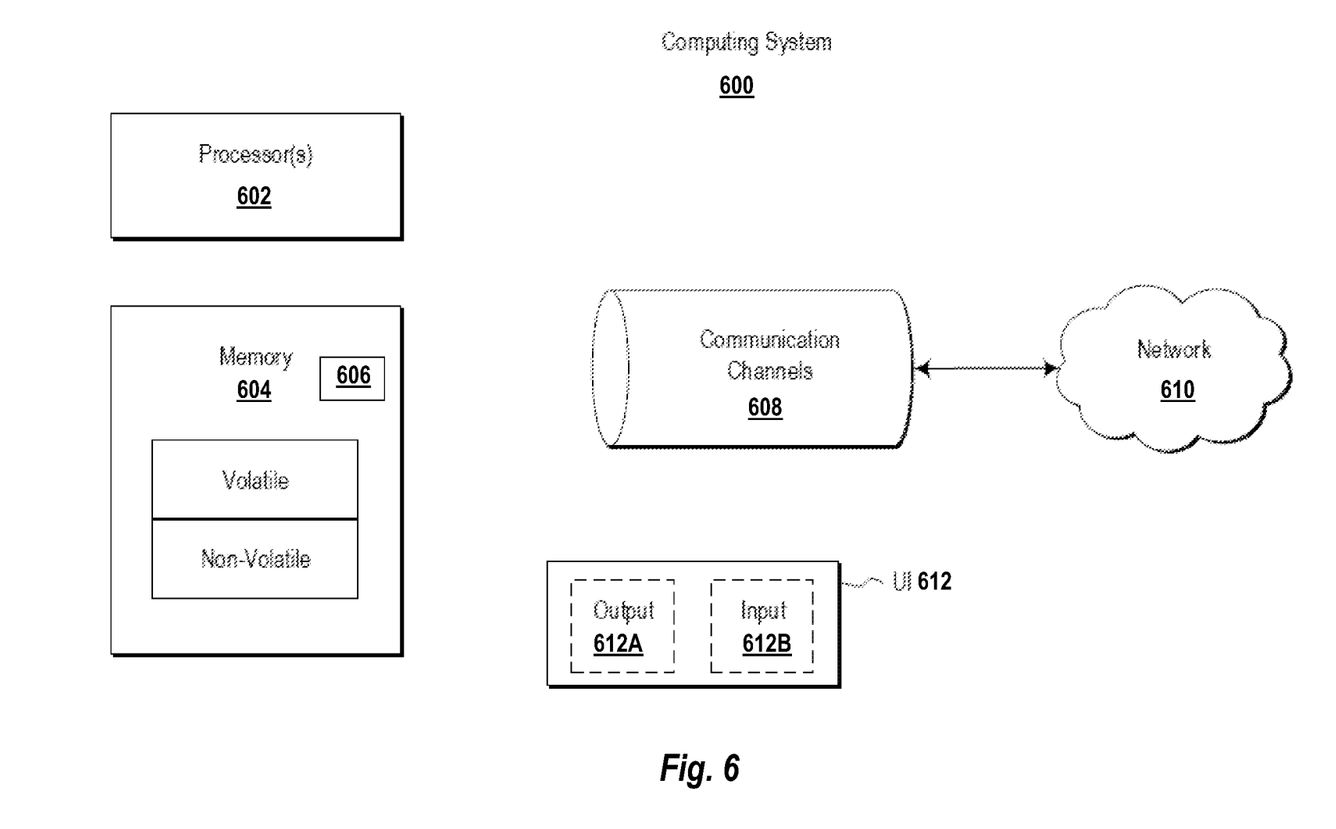
FIG. 6 illustrates an example computing system in which the principles described herein may be employed.

As illustrated in FIG. 6, in its most basic configuration, a computing system 600 typically includes at least one processing unit 602 and memory 604. The processing unit 602 may include a general-purpose processor and may also include a field-programmable gate array (FPGA), an application-specific integrated circuit (ASIC), or any other specialized circuit. The memory 604 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 600 also has thereon multiple structures often referred to as an "executable component". For instance, memory 604 of the computing system 600 is illustrated as including executable component 606. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 604 of the computing system 600. Computing system 600 may also contain communication channels 608 that allow the computing system 600 to communicate with other computing systems over, for example, network 610.

While not all computing systems require a user interface, in some embodiments, the computing system 600 includes a user interface system 612 for use in interfacing with a user. The user interface system 612 may include output mechanisms 612A as well as input mechanisms 612B. The principles described herein are not limited to the precise output mechanisms 612A or input mechanisms 612B as such will depend on the nature of the device. However, output mechanisms 612A might include, for instance, speakers, displays, tactile output, holograms and so forth. Examples of input mechanisms 612B might include, for instance, microphones, touchscreens, holograms, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "NIC"), and then eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code. In some embodiments, neural network computer chips are used to make streaming data and processing AI models faster. Besides integrated circuits, in some embodiments, a peripheral component interconnect (PCI) type card and/or a USB component are attached to a computing system to make streaming data, analysis, and audio generation occur with minimum latency.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, handheld devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 600 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processing unit 602 and memory 604, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented in a computer system that includes a processor, the method comprising:
   accessing first training data comprising a plurality of audiovisual datasets from a service computing system that includes one or more first trained AI models;
   analyzing each of the plurality of audiovisual datasets by the one or more first trained AI models, to extract a plurality of visual features and a plurality of audio features, wherein the plurality of visual features include at least one of a first visual feature associated with facial recognition or a second visual feature associated with a human expression;
   identifying one or more first correlations between the plurality of visual features and the plurality of audio features;
   generating one or more second trained AI models based on using the one or more first correlations between the plurality of visual features and the plurality of audio features as second training data for one or more second AI models, the one or more second trained AI models trained to compose one or more audio scores for accompanying an input visual dataset; and
   based on a particular input visual dataset received from a client computer device, generating a particular audio score using at least the one or more second trained AI models.

2. The method of claim 1, the method further comprising:
   analyzing each of the plurality of audiovisual datasets to extract a plurality of textual features;
   identifying one or more second correlations between the plurality of textual features and the plurality of audio features; and
   training the one or more second AI models based on the one or more second correlations between the plurality of textual features and the plurality of audio features.

3. The method of claim 1, wherein the plurality of visual features also include at least one of a third visual feature associated with a sentiment, a fourth visual feature associated with object recognition, a fifth visual feature associated with location recognition, or a sixth visual feature associated with situation awareness.

4. The method of claim 1, wherein the plurality of audio features include at least one of a first audio feature associated with a genre, a second audio feature associated with a sound effect, or a third audio feature associated with an instrument.

5. The method of claim 1, wherein the one or more second trained AI models include a genre AI model configured to identify one or more genres among a plurality of genres to be used in the one or more audio scores for accompanying the input visual dataset.

6. The method of claim 1, wherein the first training data further comprises one or more instruments corresponding to each of the plurality of audiovisual datasets.

7. The method of claim 6, wherein the one or more second trained AI models comprise an instrument AI model configured to select the one or more instruments among a plurality of instruments to be used in the one or more audio scores.

8. The method of claim 1, wherein the first training data further comprises one or more sound effects corresponding to each of the plurality of audiovisual datasets.

9. The method of claim 8, wherein the one or more second trained AI models comprise a sound effect AI model configured to select the one or more sound effects among a plurality of sound effects to be applied in the one or more audio scores.

10. The method of claim 1, wherein the one or more second trained AI models include an anticipation AI model configured to identify a time in the input visual dataset when a particular type of event among a plurality of types of events is about to happen and cause the one or more audio scores to start to perform about the time identified by the anticipation AI model.

11. A computing system, comprising:
one or more processors; and
one or more computer-readable media having stored thereon computer-executable instructions that are structured such that, when executed by the one or more processors, the computer-executable instructions configure the computing system to at least:
access first training data comprising a plurality of audiovisual datasets from a service computing system that includes one or more first trained AI models;
analyze each of the plurality of audiovisual datasets by the one or more first trained AI models, to extract a plurality of visual features and a plurality of audio features, wherein the plurality of visual features include at least one of a first visual feature associated with facial recognition or a second visual feature associated with a human expression;
identify one or more first correlations between the plurality of visual features and the plurality of audio features;
generate one or more second trained AI models based on using the one or more first correlations between the plurality of visual features and the plurality of audio features as second training data for one or more second AI models, the one or more second trained AI models trained to compose one or more audio scores for accompanying in input visual dataset; and
based on a particular input visual dataset received from a client computer device, generate a particular audio score using at least the one or more second trained AI models.

12. The computing system of claim 11, wherein the computer-executable instructions also configure the computing system to at least:
analyze each of the plurality of audiovisual datasets to extract a plurality of textual features;
identify one or more second correlations between the plurality of textual features and the plurality of audio features using; and
train the one or more second AI models based on the one or more second correlations between the plurality of textual features and the plurality of audio features.

13. The computing system of claim 11, wherein the plurality of visual features also include at least one of a third visual feature associated with a sentiment, a fourth visual feature associated with object recognition, a fifth visual feature associated with location recognition, or a sixth visual feature associated with situation awareness.

14. The computing system of claim 11, wherein the plurality of audio features include at least one of a first audio feature associated with a genre, a second audio feature associated with a sound effect, or a third audio feature associated with an instrument.

15. The computing system of claim 11, wherein the first training data further comprises one or more instruments corresponding to each of the plurality of audiovisual datasets.

16. The computing system of claim 15, wherein the one or more second trained AI models comprise an instrument AI model configured to select the one or more instruments among a plurality of instruments to be used in the one or more audio scores.

17. A computer program product comprising one or more hardware storage devices having stored thereon computer-executable instructions that are structured such that, when the computer-executable instructions are executed by one or more processors of a computing system, the computer-executable instructions cause the computing system to:
access first training data comprising a plurality of audiovisual datasets from a service computing system that includes one or more first trained AI models;
analyze each of the plurality of audiovisual datasets by the one or more first trained AI models, to extract a plurality of visual features and a plurality of audio features, wherein the plurality of visual features include at least one of a first visual feature associated with facial recognition or a second visual feature associated with a human expression;
identify one or more first correlations between the plurality of visual features and the plurality of audio features;
generate one or more second trained AI models based on using the one or more first correlations between the plurality of visual features and the plurality of audio features as second training data for one or more second AI models, the one or more second trained AI models trained to compose one or more audio scores for accompanying an input visual dataset; and
based on a particular input visual dataset received from a client computer device, generating a particular audio score using at least the one or more second trained AI models.

18. The computer program product of claim 17, wherein the computer-executable instructions also configure the computing system to at least:
analyze each of the plurality of audiovisual datasets to extract a plurality of textual features;
identify one or more second correlations between the plurality of textual features and the plurality of audio features; and
train the one or more second AI models based on the one or more second correlations between the plurality of textual features and the plurality of audio features.

* * * * *